Sept. 5, 1961  A. E. BROUGHTON  2,998,845
FOAM KILLING SPRAY SYSTEM FOR VACUUM CONTROL ASSEMBLY
Filed Feb. 10, 1960  3 Sheets-Sheet 1

INVENTOR.
ARTHUR E. BROUGHTON
BY
John W. Adams
ATTORNEY

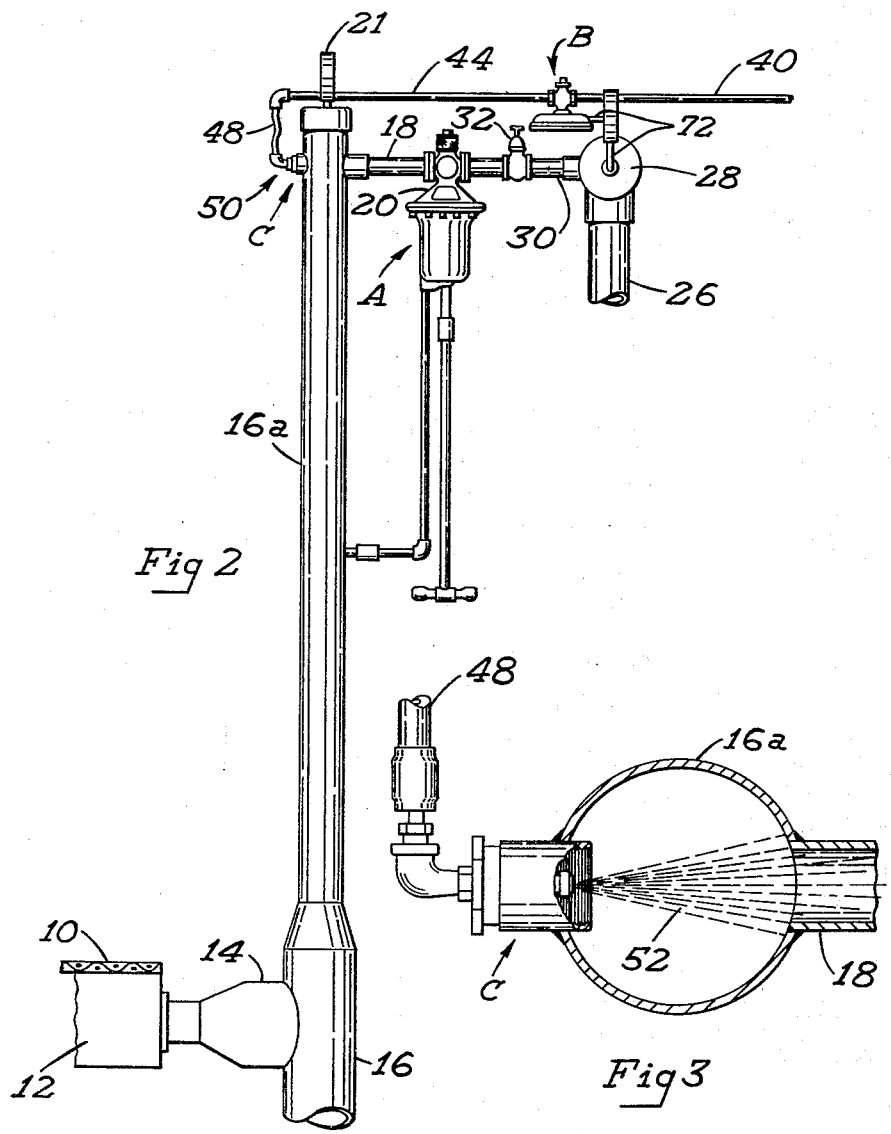

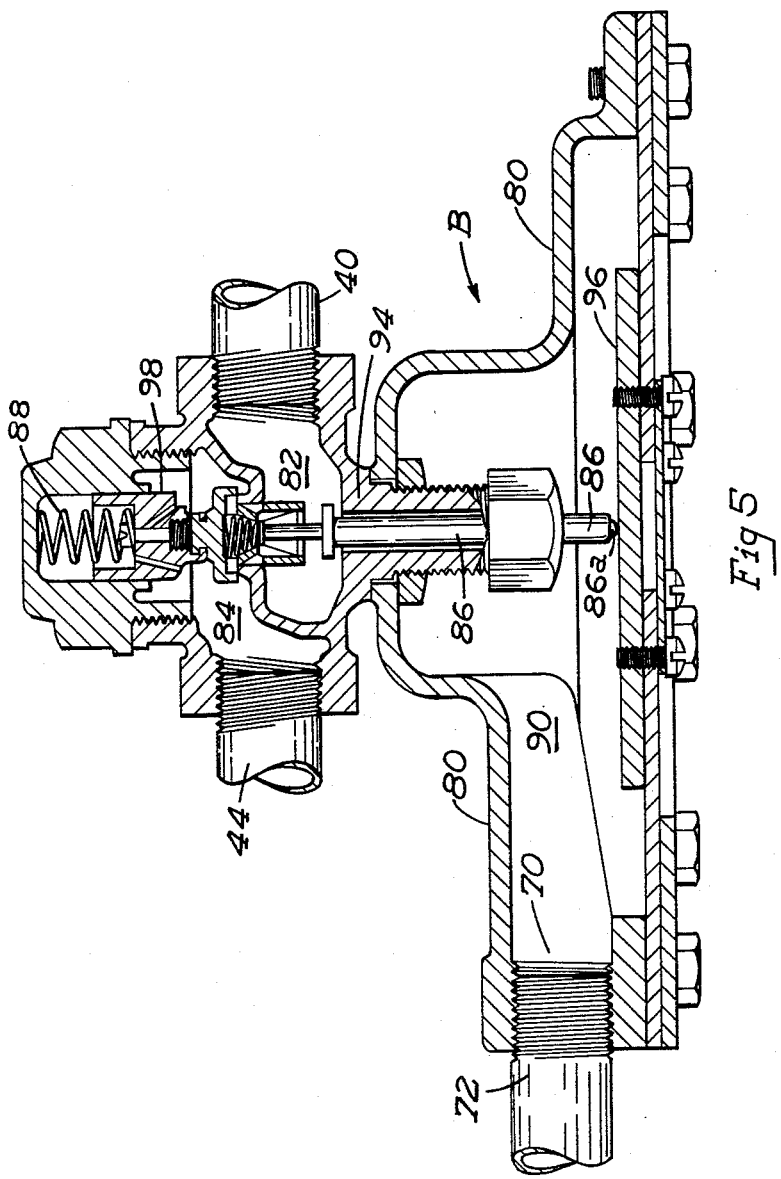

United States Patent Office 2,998,845
Patented Sept. 5, 1961

2,998,845
FOAM KILLING SPRAY SYSTEM FOR VACUUM CONTROL ASSEMBLY
Arthur E. Broughton, Glens Falls, N.Y.
Filed Feb. 10, 1960, Ser. No. 7,857
8 Claims. (Cl. 162—252)

This invention relates to a spray device for use in the vacuum system of paper making machines for withdrawing moisture from the paper pulp during the process of manufacturing paper.

It is a specific object of this invention to provide a fresh water spraying device particularly adapted for use in vacuum control systems such as the system invented by me and disclosed and claimed in U.S. Pat. No. 2,745,322. Although the apparatus set forth in my said prior patent has operated satisfactorily, I have found that the efficiency thereof is vastly increased by incorporating therein apparatus embodying my present invention, especially when used with a very efficient vacuum pump.

It is a further specific object of this invention to provide a spraying apparatus for introducing a fresh water spray into the stand-pipe of such a vacuum control system which is directed across the stand-pipe and into the conduit therefrom leading to the control valve which controls the vacuum in the stand-pipe and consequently the vacuum exerted upon the paper pulp to remove the moisture therefrom.

It is also an object to provide such a spraying apparatus connected to a source of fresh water to kill the foam which forms within the stand-pipe and ultimately corrodes the valve and interferes with efficient operation of the control system.

It is also an object to provide such a spraying apparatus designed to spray directly onto the valve mechanism to continuously clean the same whenever the vacuum system is in operation.

It is also an object to provide a vacuum powered water supply valve to control the flow of water to the valve-cleaning and foam killing spray device which is actuated to supply water to said device only when the vacuum control system is in operation.

These and other objects and advantages will more fully appear from the following description made in connection with the accompanying drawing wherein like reference characters refer to the same or similar parts throughout the several views, and in which:

FIG. 2 is a side elevational view, partly broken away, of the apparatus shown in FIG. 1 and viewed from the right as the apparatus is shown in FIG. 1;

FIG. 3 is a top elevational view of the exterior portion of a spray nozzle shown in FIG. 2 and showing the stand-pipe and control conduit therefrom in cross section, and showing spray from the nozzle, by broken lines, entering thereinto;

Figure 1:
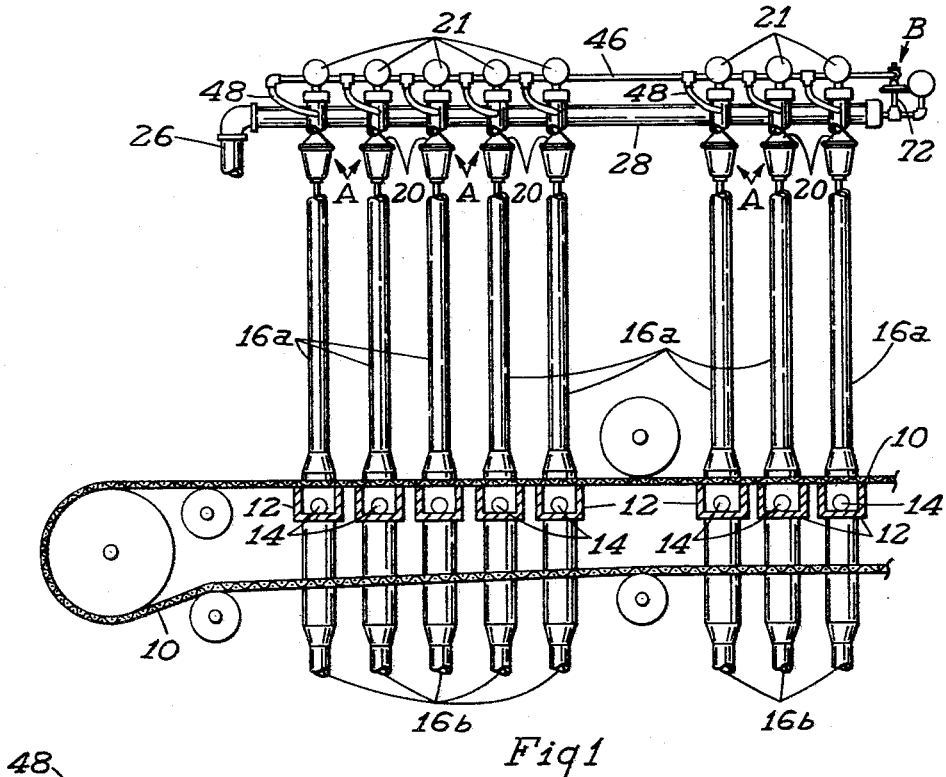
FIG. 1 is a front elevational view showing the vacuum controlled spraying device incorporated into the vacuum control system and suction head of a paper making machine.

In the form of the invention as best shown in FIG. 1, paper pulp material to be treated is conveyed upon a wire mesh belt 10 which passes successively across the open top of a plurality of flat boxes 12 within which a vacuum is maintained to withdraw moisture from the materials on the belt. Each flat box communicates at one end thereof with one end of a withdrawal conduit 14 which is connected at the other end to a stand-pipe 16 within which a vacuum is maintained at a pressure controlled by means disclosed in my said U.S. Pat. No. 2,745,322.

Each of the stand-pipes 16 communicates, at the upper end portion or air leg thereof, through a horizontal pipe 18, into one end of the upper casing 20 of a diaphragm operated vacuum control mechanism A as described in my said earlier patent. The vacuum within each stand-pipe, or air leg, 16a actuates a negative pressure indicator 21 connected to the top of each stand-pipe 16. Air and gases sucked from the flat boxes 12 is withdrawn at the upper, or air-leg portion 16a thereof. Liquids removed from the flat boxes 12 through the withdrawal conduits 14 flow downwardly into the lower end 16b of the stand-pipe to be removed in the same manner as described in my said earlier U.S. Pat. No. 2,745,322.

A vacuum is provided by a conventional suction pump, such as the pump described in my said earlier patent, to produce a vacuum in the upright main suction line 26, shown in part in FIG. 1. The main suction line 26 communicates with a horizontal vacuum header pipe 28. A plurality of header branch pipes 30 communicate respectively between each of the vacuum control devices A and the vacuum header 28, as best shown in FIG. 2. In the form shown in FIG. 2, a manually operated valve 32 is provided upon the header branch pipe 30 to permit manual control of the vacuum within each stand-pipe 16.

When a relatively high degree of negative pressure is maintained within the vacuum header 28 in the vacuum system thus described, it has been found that a foam or froth tends to form in the vacuum withdrawal conduit which builds up in increasing quantities within the stand-pipe 16 communicating with each flat box 12. When the moisture removing vacuum system is operated over a substantial period of time, the foam thus formed may completely fill the stand-pipe 16 and invade the control valve A and the vacuum header 28 to interfere with operation of the vacuum system and will ultimately cause corrosion of the valve. It thus becomes necessary to provide means for reducing the foam and maintaining the valve A clean in order to operate the vacuum mechanism efficiently for any extended period of time.

In the form of the invention shown in the accompanying drawing, a fresh water supply pipe 40 as best shown in FIG. 2, communicates with the water intake opening in a vacuum actuated valve designated generally by the letter B and shown in detail in FIG. 5. The vacuum control opening in the valve B communicates with the vacuum header 28 to actuate the valve B as hereinafter described.

Figure 4:
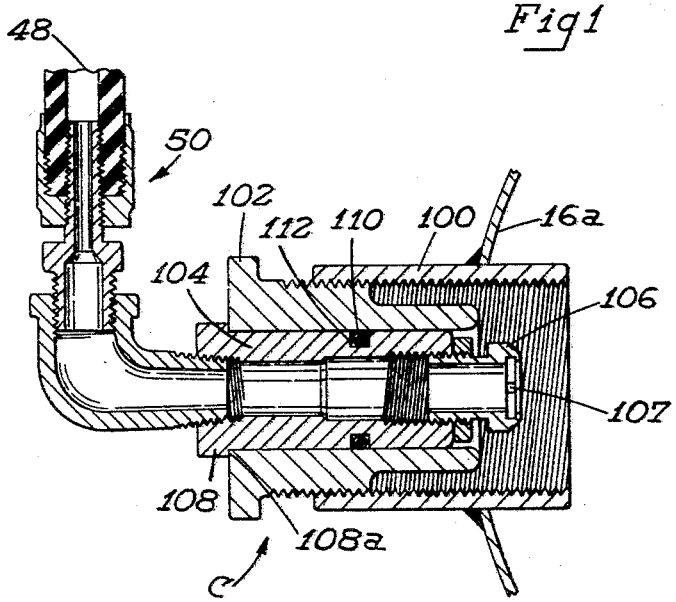
FIG. 4 is a central horizontal sectional view, partly in elevation, of a spray nozzle connected to a vacuum stand-pipe, which is partly broken away; and, FIG. 5 is a central vertical sectional view of the vacuum controlled valve controlling the spray nozzle, and having parts thereof in elevation.

The water leaving the valve B through the water discharge pipe 44 enters a spray pipe header 46, as best shown in FIG. 1. A header branch conduit 48 communicates between the fresh water header pipe 46 and the outer end portion of a spray nozzle assembly C near the upper end of each of the stand-pipes 16. In the form of the invention shown, the main portion of the branch pipe 48 consists in a flexible synthetic tubing. In the form shown in FIG. 4, the header branch conduit 48 is threadably received upon a metallic spray nozzle head 50 designed to insure a stable liquid tight connection therebetween.

As best shown in FIG. 2, the header branch 48 opens through the nozzle C into the stand-pipe 16 in horizontally aligned and diametrically opposed relation to the horizontal pipe 18 which communicates between the vacuum control mechanism A and the header 16. A spray nozzle assembly designated generally by the letter C is provided upon the lower end of the header branch 48 at the end thereof communicating into the stand-pipe 16 as best shown in detail in FIG. 4. During spraying operative action by the spray nozzle C, the spray therefrom not only enters the stand-pipe 16 but also is directed into the horizontal pipe 18 leading therefrom into the vacuum control valve A, as best shown in FIG. 3. The fresh water spray, shown by broken lines 52 in FIG. 3, effectively reduces foam into liquid and air or gas in the pipes 16 and 18 so that vacuum therewithin can be effectively controlled by the diaphragm operated vacuum control A and also cleans the valve A.

The fresh water supply control valve B, as shown in detail in FIG. 5 is normally closed when the machine is not in operation and thus when a negative pressure is not maintained in the vacuum header 28. The vacuum control valve B comprises a casing 80 which divides the valve into three separate chambers. The fresh water intake chamber 82 is separated from the discharge chamber 84 by a valve plunger 98 which is normally urged downwardly within a vertical cylinder into closed position by tension exerted thereon by a coil spring 88. The control chamber 90 of the valve B communicates through the opening 70 therein with the vacuum header 28 through a vacuum feed pipe 72. The lower end 86a of the stem 86 is pressed downwardly against the inner wall of a pressure sensitive diaphragm 96 by the plunger 98. The plunger 98 separates the chambers 82 and 84 in the absence of a vacuum within the chamber 90, as when the whole pulp drying machine is not operating and air pressure in the header 28 is equal to atmospheric pressure. When a vacuum is produced in the header 28 and the valve chamber 90, the plate 96, which is made from a flexible substance, is thrust upwardly by atmospheric pressure from the outside. The plate 96 then pushes the valve stem 86 upwardly to move the valve plunger 98 upwardly and open the intake chamber 82 into the outlet chamber 84. Fresh water from the source connected to the intake pipe 40 then flows through the valve B into the header 46 and into each header branch 48 to the nozzles C.

Small particles of solid materials are also removed from the material being treated by the vacuum system, and, not infrequently, these materials will clog a spray nozzle emptying into the vacuum system described earlier. It is desirable, therefore, that the spray nozzles be constructed for quick and easy removal and replacement thereof from the vacuum system, to permit quick and easy inspection and cleaning of each spray nozzle C. In the form of the spray nozzle shown in FIG. 4, a hollow cylindrical sleeve 100 is attached in fixed relation to the stand-pipe 16 and extends into the stand-pipe a considerable distance as shown. A hollow bolt 102 is threadably inserted into the sleeve 100, and has a cylindrical generally smooth, central opening therein for slidably receiving a smooth surfaced cylindrical jacket 104 which contains the spray nozzle in fixed relation therein. A spraying head 106, having a constricted spray opening 107, extends beyond the inner end of the jacket 104 into the hollow sleeve 100 to direct a spray therefrom into the stand-pipe 16 opposite the withdrawal pipe 18 leading to the vacuum control mechanism A. The outer end of the jacket 104 forms an annular flange 108 which is larger in diameter than the opening through the hollow bolt 102 within which the jacket 104 is received. The inner end 108a of the flange 108 abuts the outer portion of the hollow bolt 102 surrounding the cylindrical opening therein to limit inward movement of the jacket 104 into the bolt 102 as shown, when the nozzle and jacket are disposed in spraying operative position.

A compressible O-ring 110 is retained within a depression 112 encircling an intermediate portion of the spray nozzle jacket 104. The O-ring 110 is designed to be slightly compressed against the cylindrical inner wall of the hollow bolt 102 when the jacket 104 is actually inserted therein to form an air tight seal between the jacket 104 and the bolt 102, and also to form a tight fit between the jacket and the cylindrical opening in the hollow bolt 102 to positively retain the jacket 104 in operative position therein when fresh water under pressure is introduced into the spray nozzle.

Each spray nozzle jacket 104 can be manually inserted into operative position within the hollow bolt 102 and can also be manually removed therefrom when necessary to clean the spray nozzle attached thereto. The fresh water header branch 48 which feeds fresh water into the spray nozzle C is flexible, as earlier described, to permit removal and insertion of the spray nozzle jacket into operative position without the necessity of difficult and costly manipulation of threaded couplings in order to remove a particular spray nozzle for cleaning.

It will, of course, be understood that various changes may be made in the form, details, arrangements and proportion of parts without departing from the scope of my invention, which generally stated consists in the matter set forth in the appended claims.

What is claimed is:

1. Apparatus for reducing foam in the moisture removing vacuum system of a paper making machine comprising a suction box positioned to remove moisture from an overlying layer of diluted paper pulp, a withdrawal conduit communicating with said suction box to permit the air and moisture drawn into said suction box to be removed therefrom, an upstanding water and air separation stand-pipe communicating with said withdrawal conduit and having an upwardly extending air withdrawal leg provided with an opening in the upper portion thereof, a suction conduit communicating through said opening with said stand-pipe, a regulator valve in said conduit controlling the vacuum maintained within said stand-pipe, and means for producing a vacuum through said valve, spraying means within said air leg disposed opposite the opening into said withdrawal conduit for introducing a fresh water spray into said air leg directed toward the opening into said withdrawal conduit to reduce foam formed within said air leg and prevent said foam from entering said vacuum control valve.

2. The structure set forth in claim 1 and a plurality of said upstanding air legs respectively communicating laterally with one of said vacuum control valves, a suction header pipe having a plurality of header branches respectively communicating with each of said vacuum control valves to produce a vacuum within each of said air legs and communicating at one end thereof with a source of vacuum producing power, a plurality of said spraying means respectively communicating with each of said air legs, a header pipe having a plurality of header branches communicating respectively with each of said spraying devices to supply fresh water thereto, and valve means at one end of said fresh water pipe communicating with a source of fresh water and adjustable to regulate pressure within said header and to close the same to terminate said spraying of fresh water into all of said air legs.

3. The structure set forth in claim 2 and said valve controlling the flow of water into said fresh water header having conduit means connected thereto at one end and connected at the other end to said vacuum header, said fresh water control valve being responsive to the production of negative pressure within said vacuum header to permit fresh water from said water supply source to flow therethrough and into said fresh water header pipe and said valve closing in response to reduction of negative pressure in said vacuum header to atmospheric pressure, so that fresh water is sprayed into each of the air leg pipes only during moisture removing operation of the paper making machine.

4. The structure set forth in claim 2 and said fresh water supply valve being adjustable to regulate the pressure within said header and consequently within each of the header branches to control the amount of fresh water sprayed into each air leg stand pipe, said fresh water supply valve being responsive to the degree of negative pressure within said vacuum header to respectively increase and decrease water pressure within said fresh water header when negative pressure within said vacuum header is respectively increased and decreased.

5. The structure set forth in claim 4 and said fresh water header branches being of flexible material, and each of said spraying nozzle devices being removable from operative position to expose the same for cleaning and the like.

6. The structure set forth in claim 5 and each spray nozzle device comprising a spray nozzle seat attached to each of said air leg stand pipes, each of said spray nozzle devices being encased axially within a cylindrical jacket slidably inserted into said fixed spray nozzle seat, and resilient means upon said jacket to positively retain the same in seated operative position within said spray nozzle seat.

7. In the air withdrawal stand-pipe of the vacuum system for removing moisture from paper pulp materials in a paper making machine, a spraying device disposed to introduce a liquid spray into the stand-pipe and directed against the withdrawal openings of said stand-pipe to reduce foam produced by suction of liquid from the material being treated, said spraying apparatus comprising a hollow cylindrical casing extending laterally through the side wall of said stand-pipe, a hollow bolt threadably received within said casing and having a generally smooth cylindrical opening axially therethrough and forming a generally flat annular head at the exposed end thereof, a spray nozzle jacket having an opening extending axially therethrough and having a generally smooth cylindrical exterior surface and being of an external diameter slightly smaller than the opening through said bolt for sliding longitudinal movement therein, said jacket having an enlarged annular head forming a generally flat annular shoulder at the base thereof for engaging the portion of said bolt head surrounding the cylindrical jacket opening therethrough to limit movement of said jacket in said jacket opening in the direction of the stand-pipe, said jacket having a depressed O-ring seat encircling an intermediate portion thereof, a compressible O-ring contained within said O-ring seat and encircling said jacket and being of a slightly larger exterior diameter than said jacket to engage the smooth side-wall of the bolt receiving said jacket and form a liquid tight seal therebetween, said O-ring providing friction between said jacket and said opening to positively retain the jacket in operative position within said opening but permitting removal thereof for inspection and servicing of said nozzle by exertion of jacket withdrawing pressure upon the annular jacket head sufficient to overcome the friction provided by said O-ring.

8. The structure set forth in claim 7 and a spray nozzle head threadably inserted into the narrow end of said jacket and provided with a lock nut threadably received thereupon to abut the narrow end portion of said jacket and limit threadable insertion of said nozzle head thereinto, the other end of said nozzle jacket having a threaded opening for threadably receiving the nozzle terminal portion of the fresh water header branch.

References Cited in the file of this patent

UNITED STATES PATENTS

| | | |
|---|---|---|
| 1,665,029 | Hartnett | Apr. 3, 1928 |
| 1,765,926 | Lyle | June 24, 1930 |
| 2,254,472 | Dahl | Sept. 2, 1941 |
| 2,429,030 | Rawling | Oct. 14, 1947 |
| 2,745,322 | Broughton | May 15, 1956 |